US011704769B1

(12) United States Patent (10) Patent No.: US 11,704,769 B1
Weingartner et al. (45) Date of Patent: Jul. 18, 2023

(54) SYSTEMS AND METHODS FOR IMAGE REGULARIZATION BASED ON A CURVE DERIVED FROM THE IMAGE DATA

(71) Applicant: Illuscio, Inc., Culver City, CA (US)

(72) Inventors: Mark Weingartner, Woodland Hills, CA (US); Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/159,341

(22) Filed: Jan. 25, 2023

(51) Int. Cl.
*G06T 3/40* (2006.01)
*G06T 5/00* (2006.01)
*G06T 3/00* (2006.01)

(52) U.S. Cl.
CPC .......... *G06T 3/4023* (2013.01); *G06T 3/0012* (2013.01); *G06T 5/002* (2013.01); *G06T 2207/10028* (2013.01); *G06T 2207/20072* (2013.01)

(58) Field of Classification Search
CPC ..... G06T 3/4023; G06T 3/0012; G06T 5/002; G06T 2207/10028; G06T 2207/20072; G06T 17/005; G06T 3/0037; G06T 15/06; G06T 17/20; G06T 17/205; G06T 15/04; G06T 17/10; G06T 2210/36; G06T 2219/2016; G06T 9/001; G06K 9/6219; G06K 9/00463; G06V 10/7625; G06V 30/414
See application file for complete search history.

(56) References Cited

U.S. PATENT DOCUMENTS

| | | | | |
|---|---|---|---|---|
| 6,222,555 | B1 * | 4/2001 | Christofferson | G06T 15/04 345/428 |
| 6,580,425 | B1 * | 6/2003 | Zwicker | G06T 15/205 345/420 |
| 2021/0225075 | A1 * | 7/2021 | Szilagyi | G06T 15/06 |
| 2023/0108967 | A1 * | 4/2023 | Moreton | G06T 15/06 345/423 |

FOREIGN PATENT DOCUMENTS

| | | | | |
|---|---|---|---|---|
| EP | 0981106 A | * | 2/2000 | G06T 3/40 |
| WO | WO-0042576 A2 | * | 7/2000 | G06T 17/05 |

* cited by examiner

*Primary Examiner* — Jose L Couso
(74) *Attorney, Agent, or Firm* — Ansari Katiraei LLP; Arman Katiraei; Sadiq Ansari (57) ABSTRACT

Disclosed are systems and associated methods for generating a regularized image from non-uniformly distributed image data based on a curve derived from the image data. The curve is used to reduce the non-uniformity in the image data without losing detail or changing the overall image. Regularizing the image includes obtaining a tree-based representation of the non-uniformly distributed image data, generating a regularization curve that models a particular distribution of the image data, and applying the regularization curve to the tree-based representation in order to select the nodes of the tree-based representation for the decimated image data to render in place of the original image data and the original image data to preserve and render as part of the regularized image. Specifically, the system render the original image data associated with leaf nodes and the decimated image data associated with parent nodes that intersect or are within the regularization curve.

20 Claims, 9 Drawing Sheets

SYSTEMS AND METHODS FOR IMAGE REGULARIZATION BASED ON A CURVE DERIVED FROM THE IMAGE DATA

BACKGROUND

Image decimation involves the removal of certain image data in order to render an image at a desired resolution or with a maximum amount of detail. Simplistic decimation techniques involve the removal of every Nth data point or performing a uniform downsampling from an image with asymmetric or non-uniformly distributed data points or image data. These techniques fail to preserve the image by producing inconsistent images in response to increasing or decreasing amounts of decimation.

DETAILED DESCRIPTION OF PREFERRED EMBODIMENTS

The following detailed description refers to the accompanying drawings. The same reference numbers in different drawings may identify the same or similar elements.

Provided are systems and methods for the regularization of non-uniformly distributed image data based on a curve derived from the image data. In some embodiments, the curve is derived from the density distribution of the image data, the intensity return associated with the image data, and/or other distributions derived from the positional or non-positional characteristics of the image data. The curve defines different amounts of decimation to apply to different sets of the non-uniformly distributed image data. Specifically, the amount of decimation to apply to a given region of the image changes with respect to a changing shape of the curve over a tree-based representation of the image.

In some embodiments, the curve is defined to produce a more uniform set of image data than the original non-uniformly distributed image data, and/or to produce a regularized image from rendering the more uniform set of differently decimated image data. In some such embodiments, the regularized image has a consistent resolution or level-of-detail throughout, and does not contain parts that are rendered at a higher resolution or with more detail than other parts of the regularized image. In other words, the regularized image preserves the details of the original image by performing greater decimation for parts of the image with a denser concentration of image data, and by performing less or no decimation for parts of the image with less dense concentrations of image data. In this manner, consistent images with consistent detail may be generated at different resolutions or levels of detail even as the amount of decimation defined by the curve is increased or decreased across the original image data.

In some other embodiments, the shape of the curve may be defined to preserve high-detailed regions, regions with dense image data, or other regions-of-interest, and to decimate low detailed regions, regions with sparse image data, or other regions that are not of interest. In some such embodiments, the regularized image preserves the image quality by preserving the important detail in the image and removing the background, surrounding, or irrelevant detail that do not contribute to or are meaningful to the overall image. Accordingly, the regularization curve may be used to generate a different set of consistent images that preserve image quality without having a consistent resolution or level-of-detail throughout the image. Specifically, the high-detailed regions or other regions-of-interest will remain relatively consistent in the decimated regularized images and the undecimated original image, whereas the low-detailed regions or regions that are not of interest will be affected disproportionality as the amount of decimation applied with the regularization curve increases or decrease.

In some embodiments, generating the regularized image includes applying the curve to a tree-based representation of the image data. For instance, a binary tree, octree, k-dimensional tree, and/or other tree structure may provide a hierarchical arrangement for the non-uniformly distributed image data with different amounts of decimation at different levels or layers of the tree structure. Applying the curve to the tree-based representation includes determining the depth at which different branches of the tree-based representation are traversed based on the intersection, inclusion, or exclusion of the branch nodes and the curve, and rendering the decimated or original image data associated with the nodes at the traversed depths to produce the regularized image. In this manner, the regularized image is generated without altering the tree-based representation of the image or the original image data, and without computationally expensive comparisons for the identification of image data to decimate at render time. Moreover, the shape of the curve may be defined to decimate different regions of the image differently based on any preservation or decimation criteria, or based on the non-uniform distribution of the image data.

As noted above, the image regularization is performed for images with non-uniformly distributed image data. A Light Detection and Ranging ("LiDAR") sensor, Magnetic Resonance Imaging ("MRI") device, Positron Emission Tomography ("PET") scanning device, Computerized Tomography ("CT") scanning device, time-of-flight device, photogrammatical scanner, structured light scanner, and/or other threedimensional ("3D") scanner generates the images with non-uniformly distributed image data. For instance, a 3D scanner may scan a scene using a uniform angular offset between measurements (e.g., a specific number of measurements per degree). As a result, the spatial density of measurements or image data for the scene or objects in the scene may vary based on the distance between the 3D scanner and the scene surfaces or object surfaces, the angle of the surfaces relative to the 3D scanner, or other factors.

A point cloud is an example of an image format that has non-uniformly distributed image data. The point cloud includes data points that are non-uniformly distributed in a 3D space.

Figure 1:
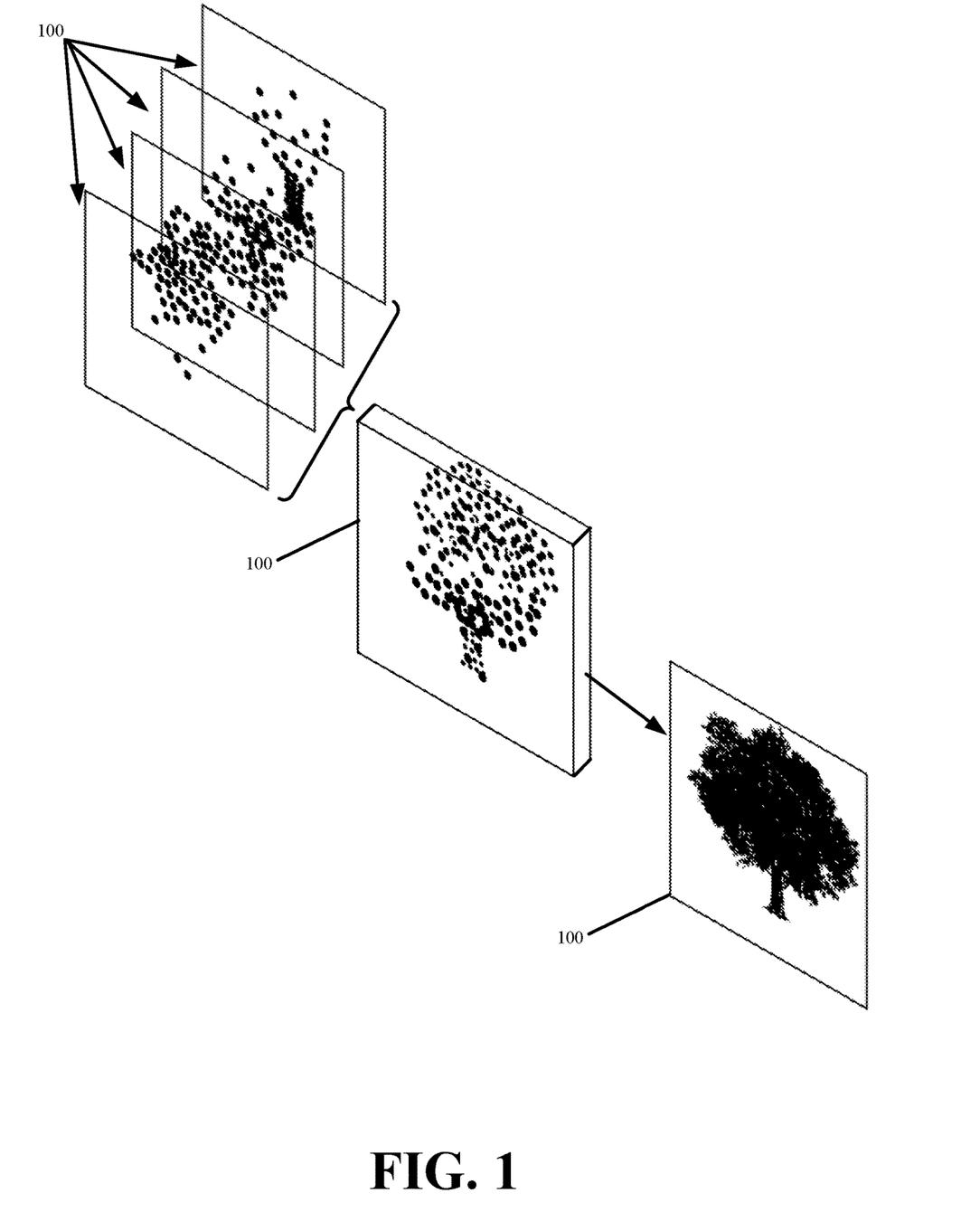
FIG. 1 illustrates an example point cloud with non-uniformly distributed data points or image data in accordance with some embodiments presented herein.

FIG. 1 illustrates an example point cloud 100 with non-uniformly distributed data points or image data in accordance with some embodiments presented herein. The data points of point cloud 100 differ from pixels of a two-dimensional ("2D") image, because certain regions of point cloud 100 have no data points, lower densities of data points, and/or higher densities of data points based on varying amounts of visual information that is detected, scanned, or created at those regions. Additionally, the position of the point cloud data points are defined in 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image have pixel data for each pixel of a defined resolution (e.g., 640×480, 800×600, etc.).

Each point cloud data point is defined with a plurality of elements. The plurality of elements includes a first set of positional elements, and a second set of non-positional or descriptive elements. Values for the positional elements and/or non-positional elements of a particular point may be calculated from the return intensity of the light, laser, or signal reflecting off that particular point and returning to the scanning device.

The positional elements include coordinates within a 3D space. For instance, each point cloud data point includes x-coordinate, y-coordinate, and z-coordinate elements to capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point. In some embodiments, the positional elements may be defined for created data points.

The non-positional elements include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional elements store other measured or derived characteristics including the chrominance, hardness, translucence, reflectivity, luminance, metallic characteristics, roughness, specular, diffuse, albedo, index of refraction ("IOR"), and/or other properties from the imaged or created surface, feature, or object. In some embodiments, the non-positional elements directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

Each point cloud data point includes an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

Figure 2:
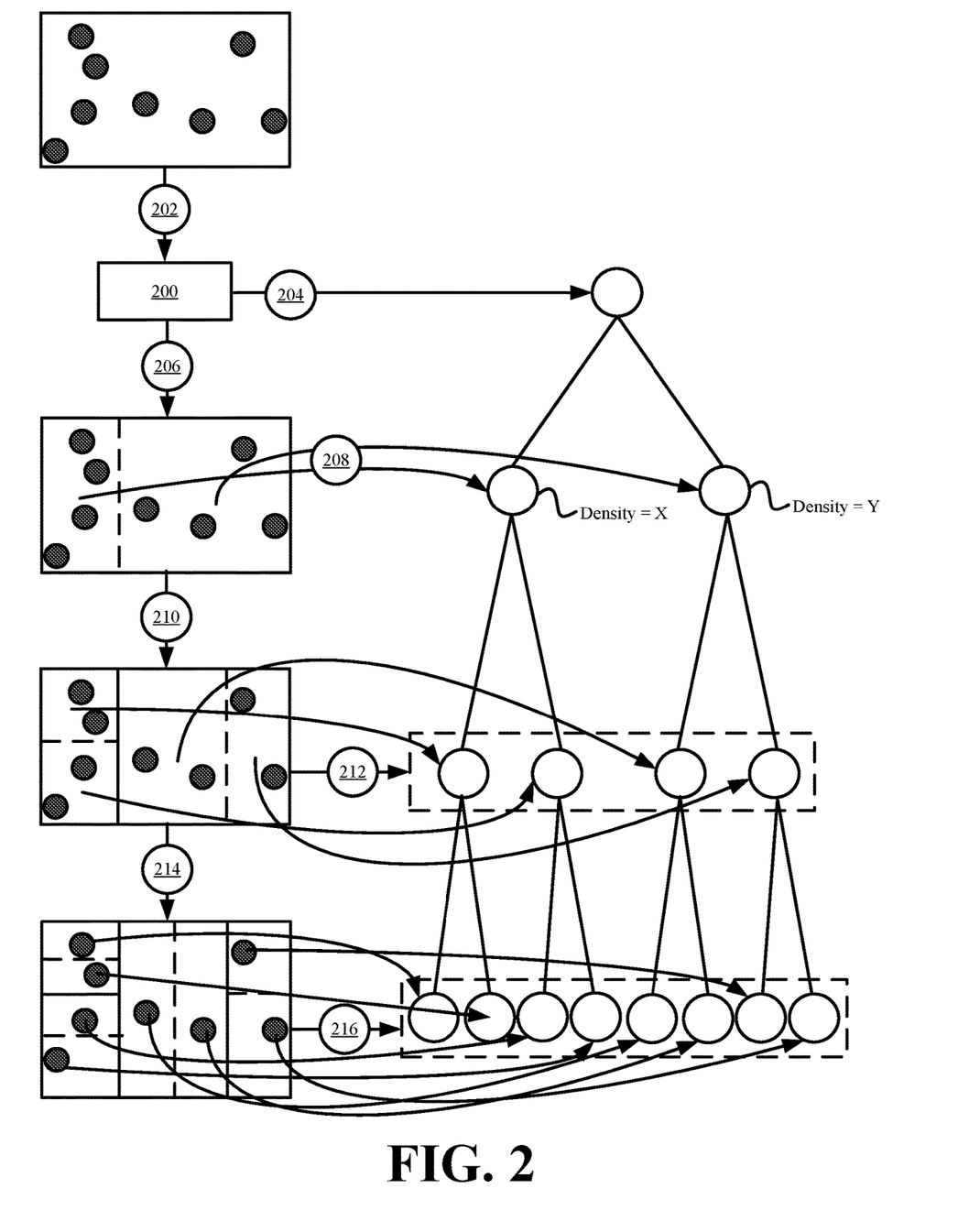
FIG. 2 illustrates an example of generating a tree-based representation for non-uniformly distributed data points of a point cloud in accordance with some embodiments presented herein.

FIG. 2 illustrates an example of generating a tree-based representation for non-uniformly distributed data points of a point cloud in accordance with some embodiments presented herein. To simplify the example, the point cloud data points are illustrated as being non-uniformly distributed in a 2D plane. However, the same techniques apply in generating a tree-based representation for data points and/or other image data that are non-uniformly distributed across a 3D space.

Imaging system 200 obtains (at 202) the data points that are stored within a point cloud file. The data points are non-uniformly distributed in the point cloud space because the density of the data points is not uniform across the point cloud space, and because certain regions of the point cloud space have a higher concentration of data points than other regions.

Imaging system 200 defines (at 204) a root node for the tree-based representation. The root node represents and/or provides access to the entire point cloud space. Metadata may be associated with the root node to specify the tree-based representation format (e.g., binary tree or octree), the overall size, the number of contained data points, and/or other information as to the entirety of the point cloud.

Imaging system 200 subdivides (at 206) the data points in different sized regions that contain an equal number of data points. For an octree representation, imaging system 200 subdivides (at 204) the data points into 8 subregions that each contain an equal number of data points. As shown in FIG. 2, imaging system 200 subdivides (at 204) the data points into two different sized regions that each contain an equal number of data points.

Imaging system 200 generates (at 208) a child node for each subdivided region. Generating (at 208) the children nodes includes connecting the children nodes to a parent node, which in this case is the root node. Each child node is defined with positional elements and non-positional elements that are derived from the positional elements and non-positional elements of the data points in the subdivided region represented by that node. For instance, the positional elements of the child node includes coordinates, a density value, and/or a size for the subdivided region of space encompassed by that child node. The density value specifies the density of the data points in the subdivided region encompassed by that child node. The color characteristics of the child node may be defined based on an averaging of the color characteristics of each data points contained in the subdivided region of that node. In other words, the node is a decimated representation of the data points contained within the subdivided region of that node. In some embodiments, the decimated representation defines a single data point at the center of the subdivided region represented by that node with a single set of non-positional elements that are derived from the non-positional elements of each data points contained in that subdivided region. In some embodiments, each node is also defined with metadata for the density of the data points in the subdivided region.

Imaging system 200 continues subdividing (at 210) the point cloud space into smaller sized regions based on the non-uniformly distributed data points contained in a parent subdivided region. In FIG. 2, imaging system 200 subdivides (at 210) each parent subdivided region so that created children subdivided regions contain half the data points as the parent subdivided region.

Imaging system 200 generates (at 212) nodes for the data points contained in each of the smaller subdivided regions. Once again, metadata may be associated with each created node based on the density of data points contained in that subdivided region.

Imaging system 200 concludes when the subdividing (at 214) produces a region with a single data point. Imaging system 200 generates (at 216) leaf nodes of the tree-based representation that correspond to individual data points of the point cloud.

In some embodiments, imaging system 200 performs a reverse construction of the tree-based representation. For instance, imaging system 200 sorts the data points based on their positional elements and/or non-positional elements, defines the leaf nodes of the tree according to the sorted data points, and defines parent nodes for a particular number of nodes in a tier below those parent nodes until the root node is reached. The parent nodes define a decimated representation of the data points or leaf nodes that are directly or indirectly connected to that parent node. Defining the decimated representation includes attributing positional and/or non-positional elements to the parent node based on the positional and non-positional elements of its children nodes. For instance, the RGB values for a parent node may be the average, mean, median, or other value computed or selected from the children node RGB values. Alternatively, the RGB values for a parent node may be defined as the maximum and minimum RGB values of the children nodes, or as a range of RGB values spanned by the RGB values of the children nodes.

In any case, imaging system 200 generates a balanced tree-based representation of the point cloud. Each node in the balanced tree-based representation may span a different sized region or volume depending on the different densities with which the data points are distributed about the 3D space of the point cloud.

Although FIG. 2 illustrates an example of generating a first tree-based representation of a point cloud from the positional elements of the point cloud data points, imaging system 200 may generate other tree-based representations for the same point cloud based on one or more other positional or non-positional elements of the point cloud data points. For instance, imaging system 200 may generate a second tree-based representation for the point cloud that organizes the point cloud data points based on values for chrominance and luminance non-positional elements of the point cloud data points. Imaging system 200 may reference the first tree-based representation when editing the positioning of a set of data points, and may reference the second tree-based representation when adjusting the lighting for a visualization or image that is rendered from the point cloud data points.

Figure 3:
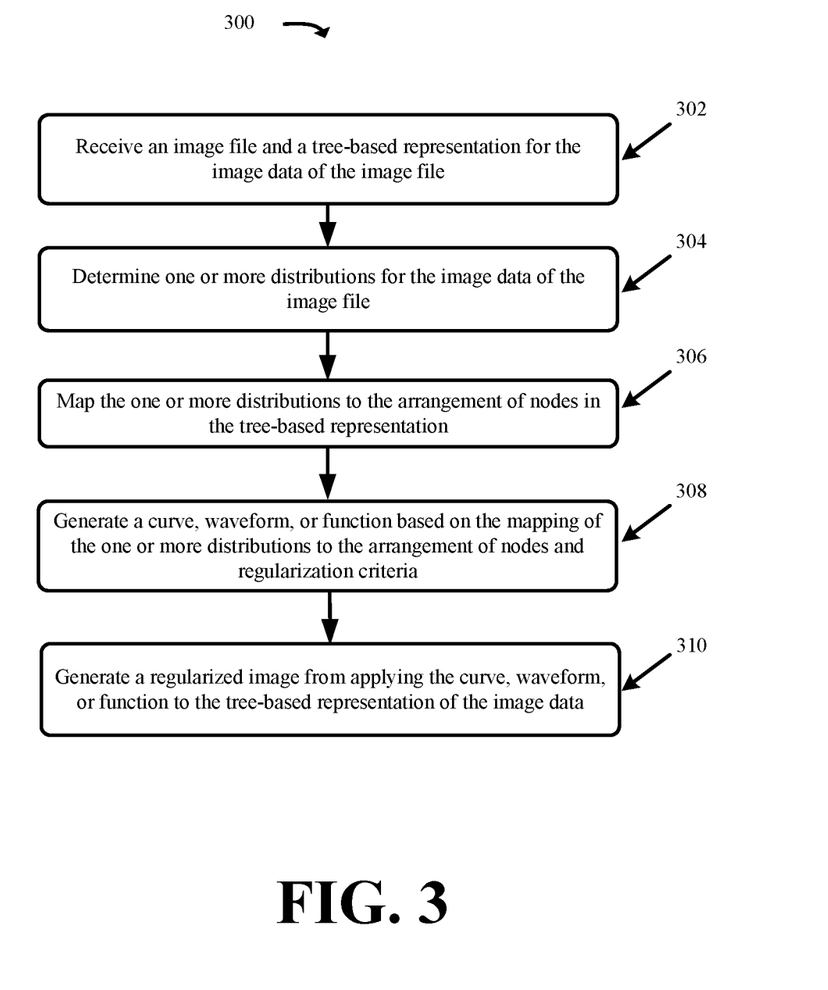
FIG. 3 presents a process for generating a regularization curve for a tree-based representation of an image in accordance with some embodiments presented herein.

FIG. 3 presents a process 300 for generating a regularization curve for a tree-based representation of an image in accordance with some embodiments presented herein. Process 300 is implemented by the imaging system. The imaging system is used to access, edit, view, interact with, and/or process different types of images including 3D image formats like point clouds. The imaging system has one or more hardware processors (e.g., Central Processing Units ("CPUs"), Graphics Processing Units ("GPUs"), and other specialized processors for image processing), memory, storage, network, and/or other hardware resources that execute one or more software applications for the regularization, interaction, and/or presentation of different image formats.

The imaging system is constrained by its resources. Specifically, the resources limit the speed with which the imaging system is able to process and/or render all the image data in a large point cloud file encoded with millions or billions of data points. Accordingly, the imaging system performs the image regularization to reduce the amount of image data (e.g., the number of data points) that is processed or rendered. Generating and presenting the regularized and/or decimated image improves the user experience by making the imaging system more responsive and produces images faster than if all the image data is processed or rendered.

Process 300 includes receiving (at 302) an image file and a tree-based representation for the image data of the image file. The image file is encoded with non-uniformly distributed image data. For instance, the image file corresponds to a point cloud with different densities of data points distributed throughout the 3D space of the point cloud. The imaging system may generate the tree-based representation when accessing the image file for the first time, or the image file may structure or arrange the image data according to the tree-based representation. In other words, the image file may contain the tree-based representation.

Process 300 includes determining (at 304) one or more distributions for the image data of the image file. The distributions define how the image data is to be regularized, and are configured for process 300 prior to executing process 300.

In some embodiments, process 300 is configured to evaluate the positional elements of the data points, and to determine (at 304) the density distribution of the image data across the image file. For instance, process 300 determines (at 304) the density distribution for the received (at 302) image file by computing the distance between neighboring data points or data points in subdivided regions of the space spanned by the image file. In some other embodiments, process 300 is configured to evaluate and determine (at 304) the distribution of intensity returns, other positional relationships, non-positional relationships, and/or outputs of the scanner that produced the image data. Accordingly, determining (at 304) the one or more distributions includes comparing one or more positional elements, non-positional elements, and/or outputs that the scanner generates for the individual data points of a point cloud.

In some embodiments, the relationship or distribution data is stored as positional elements, non-positional elements, and/or metadata of the nodes of the tree-based representation. For instance, each parent node of the tree-based representation may include metadata for the density of data points under that parent node or that are encompassed in the region spanned by that parent node. Alternatively, the density value may be derived from the coordinates defining the region spanned by the parent node and the number of leaf nodes under that parent node, or from the positional elements of each leaf node that is directly or indirectly connected to that parent node. In some such embodiments, determining (at 304) the one or more distributions includes traversing the tree-based representation, and defining the distribution based on the metadata contained in the nodes of the tree-based representation.

Process 300 includes mapping (at 306) the one or more distributions to the arrangement of nodes in the tree-based representation. Mapping (at 306) a particular distribution includes identifying which leaf nodes in the tree-based representation contain the image data that contributed to or correspond to different parts of the particular distribution. For instance, the imaging system identifies a first set of nodes representing a first set of image data distributed with a first density, a second set of nodes representing a second set of image data distributed with a second density, and maps (at 306) the first set of nodes to a first part of a density distribution representing the first density and the second set of nodes to a second part of the density distribution representing the second density.

Process 300 includes generating (at 308) a curve, waveform, or function based on the mapping (at 306) of the one or more distributions to the arrangement of nodes and regularization criteria. The regularization criteria specifies which of the mapped (at 306) one or more distributions are prioritized and preserved, and which ones are decimated. Accordingly, the imaging system generates (at 308) a 2D or 3D curve, waveform, or function that changes in relation to the changing data point density across the image file and/or that tracks those changes across the arrangement of the nodes in the tree-based representation in order to produce a desired regularization of the image data that preserves one set of image data represented in a first set of the mapped (at 306) one or more distributions over another set of image data represented in a second set of the mapped (at 306) one or more distributions.

In some embodiments, a first set of regularization criteria defines a first shape for the curve, waveform, or function relative to the one or more distributions that equalizes the density of the non-uniformly distributed image data. For instance, the generated (at 308) curve, waveform, or function may have troughs that align with the nodes in the tree-based representation that represent the image data or regions of the image of lowest density, peaks that align with the nodes that represent the image data or regions of the image of highest density, and valleys that align with the nodes that represent the image data or regions of the image with densities varying between the lowest and highest densities.

In some other embodiments, a second set of regularization criteria defines a second shape for the curve, waveform, or function relative to the one or more distributions that preserves specific regions-of-interest and that decimates other regions that are not of interest. When the regions-of-interest correspond to the high-detailed regions with dense distributions and the desired regularization is the preservation of the high-detailed regions and the decimation of the low-detailed regions, the generated (at 308) curve, waveform, or function may have troughs that align with the nodes in the tree-based representation that represent the image data or regions of the image of highest density, peaks that align with the nodes that represent the image data or regions of the image of lowest density, and valleys that align with the nodes that represent the image data or regions of the image with densities varying between the lowest and highest densities.

The imaging system may automatically derive the regularization criteria based on an analysis of the tree nodes and/or data point positioning. For instance, the imaging system uses one or more artificial intelligence and/or machine learning ("AI/ML") techniques to identify areas of densely concentrated data points and other areas of sparsely concentrated data points, and adjusts the shape of the regularization curve to regularize and/or balance the distribution of the data points. The AI/ML techniques may define different forms and shapes for the curve, apply each of the curves to the tree-based representation of the image data, simulate the resulting image data distribution, and select the curve that produces the regularization that is closest to a desired result (e.g., preserve high detail regions, preserves a baseline level of detail throughout the image, etc.). The AI/ML techniques may include a regression layer that refines the selected curve by adjusting peaks, troughs, wavelengths, and/or other parts of the curve to adjust the nodes of the tree-based representation and/or the image data that is subject to the regularization.

Process 300 includes generating (at 310) a regularized image from applying the curve, waveform, or function to the tree-based representation of the image data. The regularized image is a decimated visualization of the image data that preserves certain regions or sets of image data over other regions or sets of image data. Generating (at 310) the regularized image includes overlaying, positioning, aligning, or otherwise associating the beginning and end of the curve, waveform, or function to the first and last leaf nodes of the tree-based representation, selecting different nodes at different depths of the tree-based representation that intersect, are within, or are closest to the curve, waveform, or function, and rendering the image data associated with the selected nodes. By rendering the image data associated with the selected nodes at the different depths of the tree-based representation, the imaging system produces the regularized image in which some or all of the non-uniformity in the image data is removed. For instance, when the rendered image is regularized based on a density distribution curve that is defined to normalize image data density across the image, generating (at 310) the regularized image includes rendering the leaf nodes that represent the image data in regions with low density, and rendering the parent nodes that are one or more levels above the leaf nodes in the tree-based representation and that represent decimated image data for regions with higher density.

Figure 4:
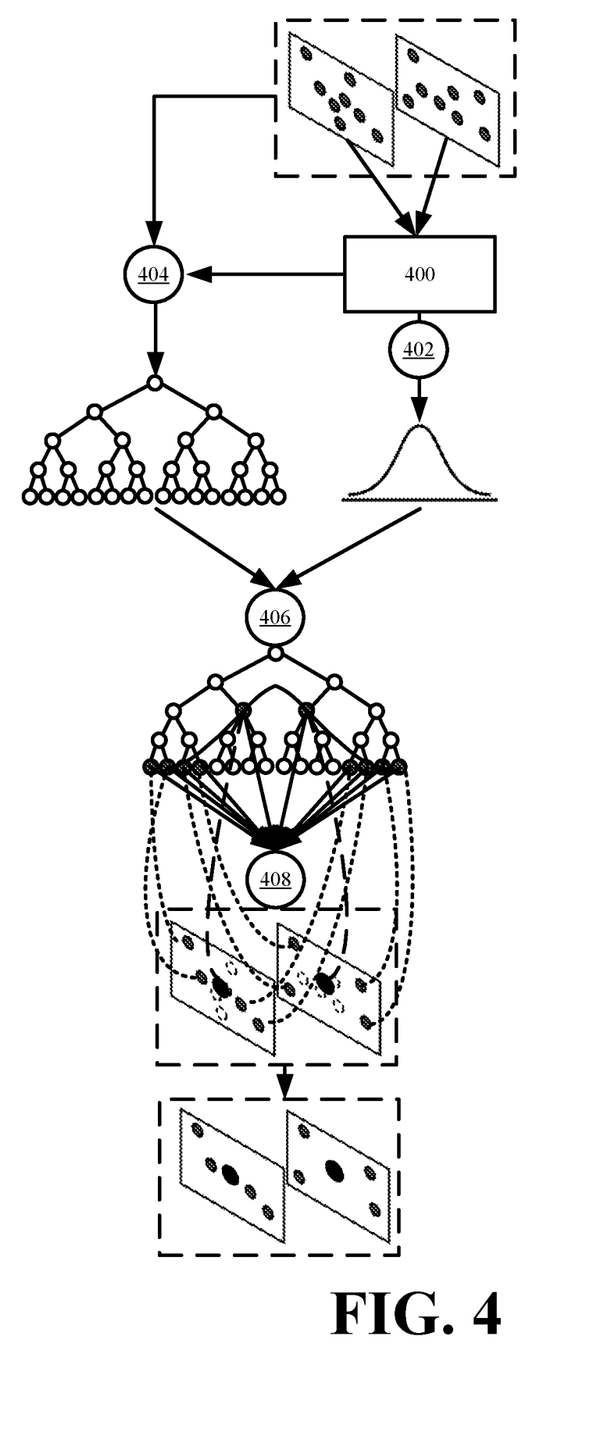
FIG. 4 illustrates an example of applying a regularization curve to a tree-based representation of image data in order to produce a regularized image in accordance with some embodiments presented herein.

FIG. 4 illustrates an example of applying a regularization curve to a tree-based representation of image data in order to produce a regularized image in accordance with some embodiments presented herein. As shown in FIG. 4, imaging system 400 derives (at 402) a regularization distribution curve based on different densities with which data points are distributed in different regions of a point cloud. The shape of the regularization curve reflects the higher density of data points in the center of the point cloud or image, and the lower density of data points the further data points are from the center of the point cloud or image. In some embodiments, imaging system 400 uses one or more AI/ML techniques to define the shape of the regularization distribution curve to achieve a desired regularization result. For instance, the AI/ML techniques analyze the positioning of the data points to determine different sets of data points that need to be repositioned, decimated, and/or modified in order to achieve a uniform or desired distribution throughout the point cloud.

Imaging system 400 obtains (at 404) a tree-based representation of the point cloud. The tree-based representation includes leaf nodes that correspond to the individual data points of the point cloud, and parent nodes that represent larger and larger regions spanned by the individual data points with increasing levels of decimation the closer the parent nodes are to the root node of the tree-based representation.

Imaging system 400 applies (at 406) the regularization curve to the tree-based representation. The application (at 406) of the regularization curve is illustrated in FIG. 4 by aligning the regularization curve over nodes of the tree-based representation where the represented densities of the regularization curve are found. In some embodiments, the aligning of the regularization curve is performed mathematically, wherein the different points along the density distribution curve correspond and/or map to different positions, heights, and/or depths along different branches of the tree-based representation.

Imaging system 400 renders (at 408) the image data associated with whichever nodes of the tree-based representation intersect, are within, or are closest to the regularization curve for the entire region of space spanned by the image file. Rendering (at 408) a leaf node includes rendering the original image data at the original density, resolution, and/or detail specified in the image file. Rendering (at 408) a parent node that is one or more levels or layers removed from the leaf nodes includes rendering a decimated or downsampled set of image data for the original image data of the leaf nodes under that parent node. In some embodiments, the parent node is rendered as a single data point positioned at the center of the positions defined for the data points represented by the leaf nodes under that parent node. The non-positional elements of the parent node may be averages, medians, or other values that are derived from the non-positional elements of the leaf nodes under that parent node.

The rendered (at 408) image data results in a regularized image that is generated from a more equal or uniform distribution of image data than the original image data of the original image file. In other words, detail for image features that were represented with a high density of data points is reduced while detail for image features that were represented with a low density of data points is preserved at their original quality.

In some embodiments, imaging system 400 provides a slider or other user interface control with which to manually tune the regularization curve and its affect on which image data is rendered or discarded. For instance, the slider may be used to increase or decrease the amplitude of the regularization curve (e.g., increase or decrease the peaks and troughs) so that more or less image data is subject to the regularization. Increasing the slider includes increasing the amplitude of the regularization curve so that the amount of decimation or downsampling increases, whereas decreasing the slider include decreasing the amplitude of the regularization curve so that more of the original detail from the point cloud or image is retained.

The regularized image is generated without having to calculate, at render time, the different densities with which the image data is distributed in the image file in order to determine which image data to decimate and which image data to keep. In other words, the positional and/or non-positional element comparisons for regularizing the image are represented by the regularization curve such that the computation and evaluation of the comparisons are avoided at render time or when generating the regularized image. Instead, rendering (at 408) the image involves the much more computationally efficient operation of determining which nodes in the tree-based representation intersect, are within, or are closest to the regularization curve, and rendering those nodes without any positional and/or non-positional element comparison between different pairs of data points in the image file.

By applying the regularization curve to the tree-based representation, all the original image data within the tree-based representation is preserved. In other words, none of the image data is discarded and the original image file is not altered in order to produce the regularized image.

Moreover, once the regularization curve is derived for an image, the regularization curve may be reused to regenerate the regularized image from the original image data with the same or different amounts of decimation. Specifically, the regularized curve may be moved up or down the tree-based representation and adjusted according to the base layer or level at which the regularized curve is aligned with the tree-based representation in order to generate different regularized images with different amount of decimation.

Figure 5:
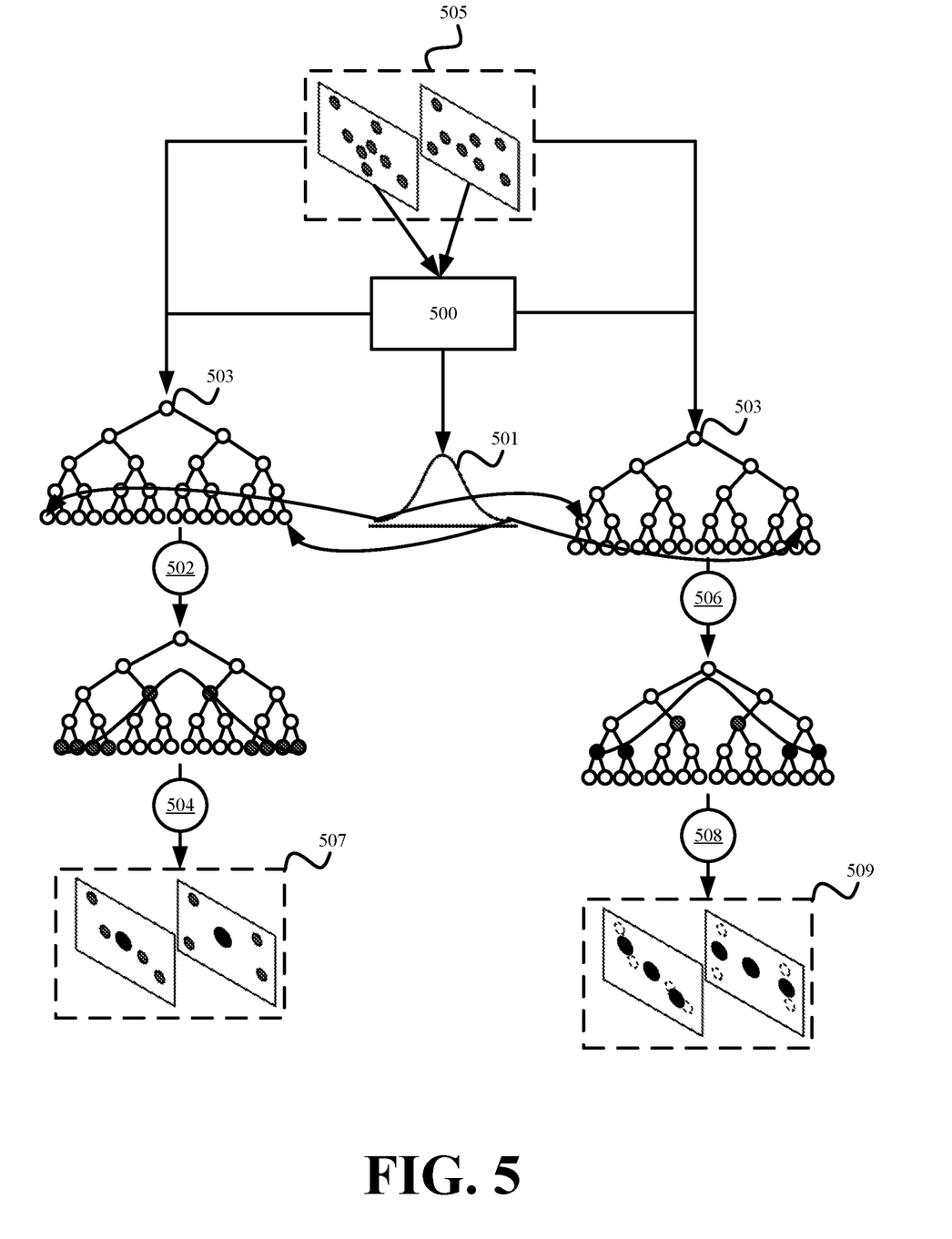
FIG. 5 illustrates an example of applying the regularization curve to increase the amount with which the resulting regularized image is decimated in accordance with some embodiments presented herein.

FIG. 5 illustrates an example of applying the regularization curve to increase the amount with which the resulting regularized image is decimated in accordance with some embodiments presented herein. Imaging system 500 applies (at 502) regularization curve 501 to the leaf node layer of tree-based representation 503 of original image 505 in order to generate (at 504) first regularized image 507 with a first amount of decimation that preserves the original image data from the least dense parts of original image 505. Specifically, first regularized image 507 preserves the original image data from the leaf nodes that intersect regularization curve 501 or that have parent nodes outside and/or not intersecting regularization curve 501.

Imaging system 500 applies (at 506) regularization curve 501 to the first parent node layer above the leaf node layer of tree-based representation 503 in order to generate (at 508) second regularized image 509 with a second amount of decimation that is greater than the first amount of decimation. Specifically, imaging system 500 raises the positioning or alignment of regularization curve 501 relative to tree-based representation 503 so that regularization curve 501 is more one or more levels or layers above the bottommost layer of the leaf nodes. Additionally, imaging system 500 adjusts the width of regularization curve 501 to match the width of the aligned tree layer. Adjusting the width of regularization curve 501 involves adjusting the distribution represented by regularization curve 501 to match the larger sized regions represented at the higher levels or layers of tree-based representation 503. Consequently, a different sets of nodes from tree-based representation 503 intersect or fall under regularization curve 501, and the image data associated with that different set of nodes is rendered to generate (at 508) second regularized image 509. In some embodiments, the positioning, form, and size (e.g., width) of regularization curve 501 is adjusted based on a slider or another user interface control provided by imaging system 500. User interactions with the user interface control cause the positioning of regularization curve 501 to change relative to tree-based representation 503 and/or the curvature and shape of regularization curve 501 to change in order to adjust the image data that is subject to regularization and the amount of regularization.

As shown in FIG. 5, second regularized image 509 is generated (at 508) with greater decimation than first regularized image 507 as the nodes rendered at the lowest levels or layers of the tree-based representation are no longer the leaf nodes but parent nodes that downsample or provide decimated image data for the image data contained in the leaf nodes directly or indirectly connected to that parent node. Second regularized image 509 is rendered at the decimated image data density represented by the first parent node layer above the leaf node of tree-based representation 503.

Accordingly, less decimation and more of the original image data may be preserved by lowering the base of the regularization curve below the leaf nodes of the tree-based representation. In some such embodiments, the rendered image may have less uniformity as image data from regions with the least dense image data are preserved, other regions with more dense image data are also preserved, and regions with the most dense image data are decimated or regularized. In other words, by lowering the regularization curve below the tree-based representation, fewer regions of the image are decimated or regularized resulting in the preservation of more of the original non-uniformity or variation in the image data than when the regularization curve is raised relative to the tree-based representation.

In some embodiments, the regularization curve has a more varied and irregular shape. In some such embodiments, the regularization curve may be represented as two or more curves, waveforms, mathematical functions, formulas, and/or expressions that are combined or connected to produce the regularization curve.

In some embodiments, the regularization curve may be generated as a best fit curve for the distribution of different densities in an image. For instance, the density distribution of image data in a point cloud or file may closely resemble the bell-shaped curve illustrated in the figures above, but may not match exactly to the bell-shaped curve. However, the bell-shaped curve may approximate the distributions with a threshold percent accuracy, and may be used for the regularization of the distributions. In other words, the imaging system may select a curve or waveform that has a regular shape or repeating frequency that most closely matches the varying distribution within image data of a point cloud or image as the regular shape or repeating frequency is more easily expressed and applied to the tree-based representation for the regularization of the image data.

Figure 6:
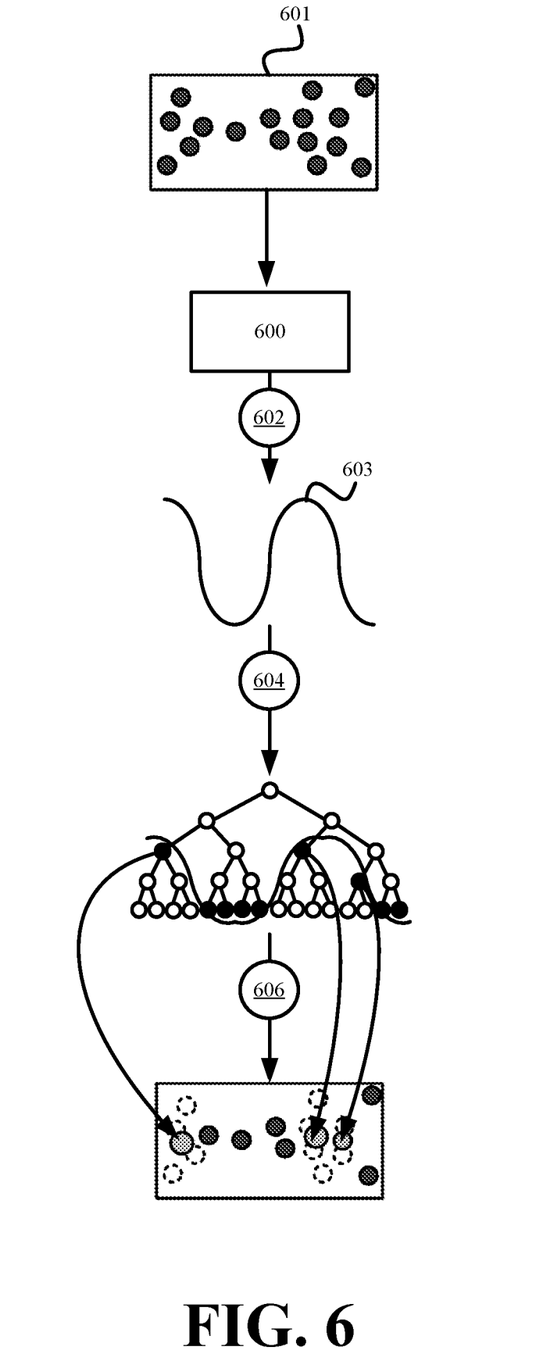
FIG. 6 illustrates an example of regularizing an image with a sinusoidal regularization curve that approximately matches the varying distribution in an image in accordance with some embodiments presented herein.

FIG. 6 illustrates an example of regularizing an image with a sinusoidal regularization curve that approximately matches the varying distribution in an image in accordance with some embodiments presented herein. Imaging system 600 analyzes the distribution of image data within image 601, determines that a sinusoidal wave has a frequency and periodicity that best models the distribution of image data, and defines (at 602) regularization curve 603 for image 601 according to the sinusoidal wave.

In response to a request to render a decimated or regularized image, imaging system 600 applies (at 604) sinusoidal regularization curve 603 to the tree-based representation of the image data. Applying (at 604) sinusoidal regularization curve 603 includes sizing and/or aligning sinusoidal regularization curve 603 so that the distributions represented by sinusoidal regularization curve 603 match to the nodes of the tree-based representation where those distributions are found. Applying (at 604) sinusoidal regularization curve 603 further includes moving the curve or down in the tree-based representation for a desired amount of decimation, resolution, or level of detail at which to render the regularized image. Imaging system 600 renders (at 606) the image data associated with the nodes of the tree-based representation that intersect and/or are within sinusoidal regularization curve 603.

In FIGS. 4-6, the regularization curve is defined according to a first set of regularization criteria that yields a first shape or form for generating regularized images with more uniformly distributed image data than the original data. The regularization curve may be defined according to different regularization criteria for a different regularization of the image data. For instance, the regularization curve may be defined to preserve image data in selected regions-of-interest by performing a lesser first amount of decimation to the image data in those identified regions-of-interest, and by performing a greater second amount of decimation to the image data in other regions.

Figure 7:
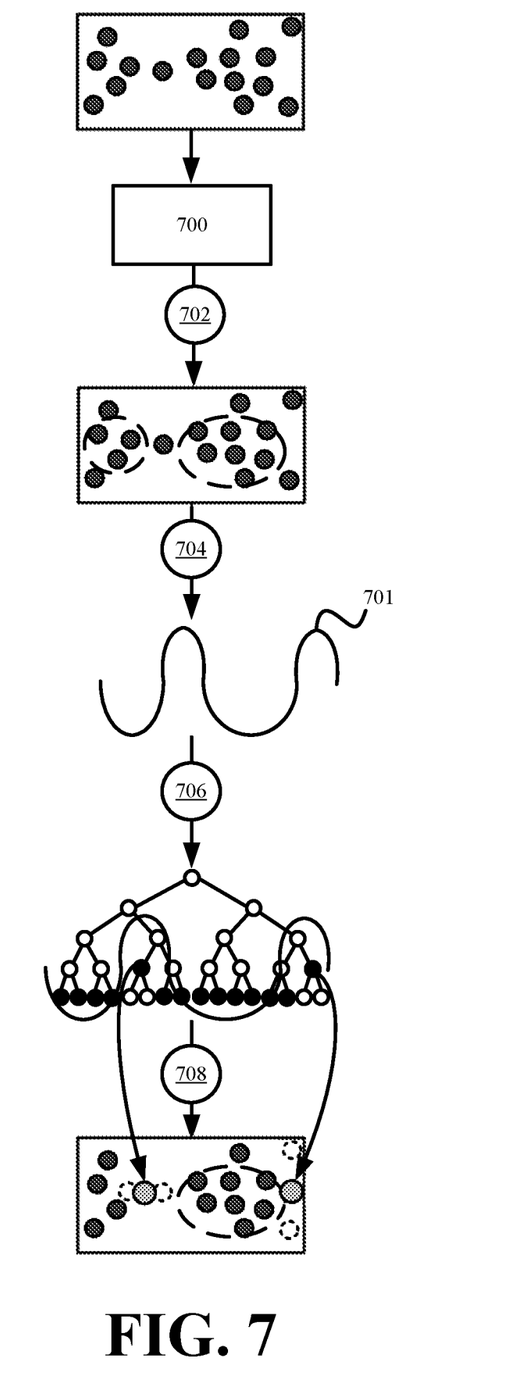
FIG. 7 illustrates an example of applying a regularization curve for the preservation of high-detailed regions of an image in accordance with some embodiments.

FIG. 7 illustrates an example of applying a regularization curve for the preservation of high-detailed regions of an image in accordance with some embodiments. The high-detailed regions may be manually selected by a user, or may be automatically selected in response to user input that defines the regularization criteria for the preservation of the high-detailed regions. The regularization criteria may be defined to preserve specific values for any one or more of the positional and non-positional elements of point cloud data points, or to preserve specific groupings of the data points (e.g., regions with highlights, regions with high contrast, regions with large color variation, etc.).

In FIG. 7, imaging system 700 identifies (at 702) the image data in the high-detailed regions, or the nodes of the tree-based representation of the image that correspond to the high-detailed regions. Imaging system 700 identifies (at 702) the image data in the high-detailed regions as the regions that have the greatest density of image data.

Imaging system 700 defines (at 704) the shape of regularization curve 701 according to the density distribution of the image data and the selected regularization criteria for preserving the high-detailed regions. Accordingly, imaging system 700 defines (at 704) regularization curve 701 with troughs to preserve and/or apply lesser decimation to those high-detailed regions and with peaks to apply greater decimation to regions with progressively less detail.

Imaging system 700 applies (at 706) regularization curve 701 to the tree-based representation of the image data, and renders (at 708) the image data associated with whichever nodes of the tree-based representation intersect, are within, or are closest to regularization curve 701. Consequently, the regularized image produced from decimating the image data according to the shape of regularization curve 701 is an image that preserves the image data in the most dense regions, and that decimates the image data in the least dense regions.

In some embodiments, the regularization curve is used as a noise filter to remove point cloud data points or image data that are generated with a low degree of confidence and/or that include noise rather than an accurately measured or captured surface. For instance, a scanner emits light, lasers, and/or other signals, and measures the return intensity and/or other characteristics of the signals as they reflect off distant objects or surfaces and return to the scanner. From the return intensity, the scanner determines the position of a point or surface in 3D space that the signal reflected off of, visual characteristics (e.g., coloring) of the point or surface, the material composition of the point or surface, strength, rigidity, and/or other physical properties of the point or surface.

These derived measurements are accurate for return intensities that are within certain value ranges or from points or objects that are a specified distance from the scanner. For instance, a signal reflecting off of a surface that is more than a specified distance or range from the scanner may have too low of a return intensity to accurately differentiate from noise or to accurately derive positioning and/or other derived values. Similarly, a surface that is less than a specified distance or range from the scanner may produce too large of an intensity return that introduces noise and/or other anomalous values and that reduce the accuracy of any measurements derived from the intensity return. Still other surface are more or less reflective and can generate return intensities that are outside acceptable tolerance for accurate measurements. Accordingly, the imaging system may generate a return intensity regularization curve to filter out noise and invalid image data, and to render an image without the filtered noise.

Figure 8:
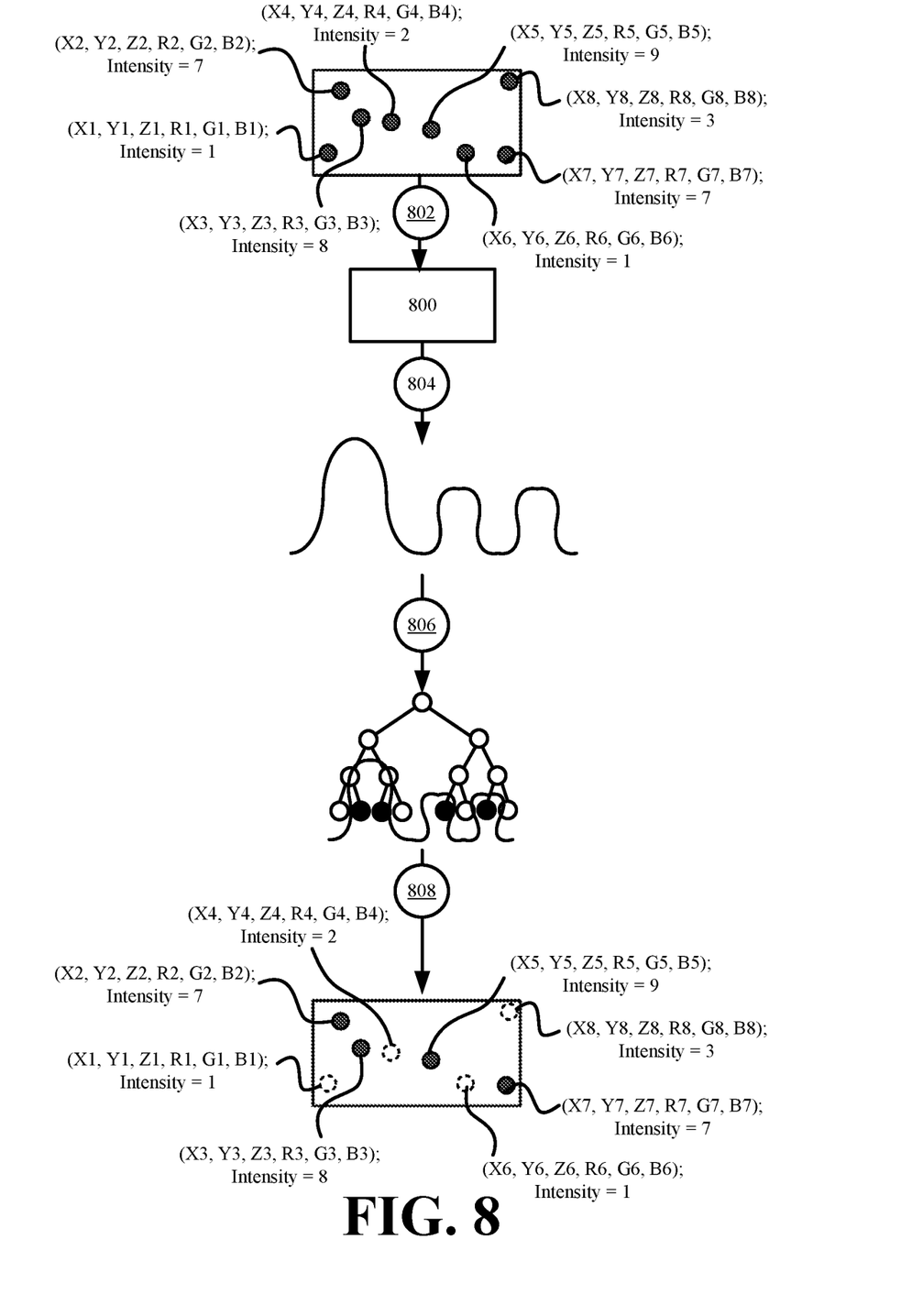
FIG. 8 illustrates an example of regularizing an image based on return intensity values associated with data points of a point cloud in accordance with some embodiments presented herein.

FIG. 8 illustrates an example of regularizing an image based on return intensity values associated with data points of a point cloud in accordance with some embodiments presented herein. Imaging system 800 receives (at 802) the point cloud data points. Each data point is defined with a set of positional elements, a set of non-positional elements, and a return intensity value. The return intensity value may be recorded as a non-positional element of the point cloud data points. The return intensity value is the measure from which the scanner generates the corresponding data point.

Imaging system 800 analyzes the return intensity values, and generates (at 804) a regularization curve based on the distribution of the return intensity values. The regularization curve is defined to exclude or filter data points or nodes with return intensity values that are outside a specified range known to produce accurate and reliable measurements. Return intensity values outside the specified range may be caused by noise, anomalous measurements, and inaccurate or unreliable measurements due to the measured point being too far, close, reflective, matte, and/or having some other property that causes the return intensity to be outside the specified range.

Imaging system 800 applies (at 806) the regularization curve to a tree-based representation of the point cloud, and renders (at 808) the nodes from the tree-based representation that intersect or are within the regularization curve. In doing so, the nodes outside the regularization curve are not rendered and excluded from the resulting image. Specifically, the nodes outside the regularization curved are considered to contain noisy data or data that is inaccurate or unreliable based on the return intensity values associated with that data. The data points that are rendered as a result of having return intensity values within the regularization curve are shown as solid black points, while the data points that are excluded from the regularized image rendering as a result of having return intensity values outside the regularization curve are shown as dotted white points.

Figure 9:
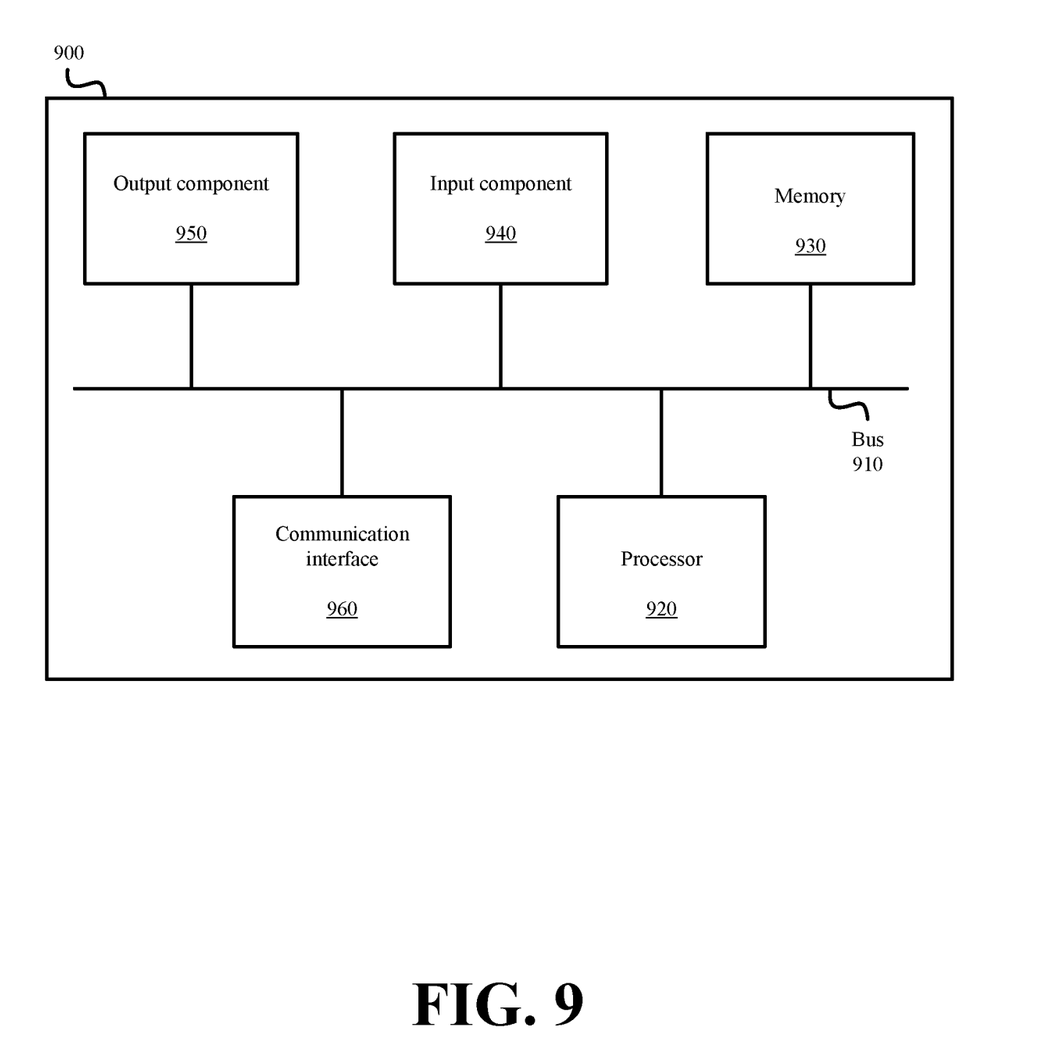
FIG. 9 illustrates example components of one or more devices, according to one or more embodiments described herein.

FIG. 9 is a diagram of example components of device 900. Device 900 may be used to implement one or more of the devices or systems described above (e.g., the imaging system). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving an image comprising a plurality of original image data that is non-uniformly distributed across a space represented by the image;
    obtaining a tree-based representation of the plurality of original image data, wherein the tree-based representation comprises a plurality of leaf nodes with each leaf node of the plurality of leaf nodes being associated with different original image data from the plurality of original image data, and a plurality of parent nodes with each parent node of the plurality of parent nodes being associated with decimated image data representing a different set of the plurality of original image data associated with a different set of the plurality of leaf nodes under that parent node with different amounts of decimation;
    generating a regularization curve based on a distribution of the plurality of original image data;
    applying the regularization curve to the tree-based representation; and
    generating a regularized image from rendering the original image data associated with a subset of the plurality of leaf nodes and the decimated image data associated with a subset of the plurality of parent nodes that intersect or are within the regularization curve.

2. The method of claim 1, wherein the regularized image comprises a more uniform distribution of image data across the space than the plurality of original image data from the image.

3. The method of claim 1 further comprising:
    selecting the subset of parent nodes that intersect or are within the regularization curve from the tree-based representation; and
    rendering the decimated image data associated with the subset of parent nodes as a substitute for the original image data associated with each leaf node under the subset of parent nodes in the tree-based representation.

4. The method of claim 1 further comprising:
    determining the distribution of the plurality of original image data based on a density with which the plurality of original image data is distributed across the space.

5. The method of claim 4, wherein generating the regularized image comprises:
    decimating a first set of regions in the space comprising the original image data with a first density; and
    preserving the original image data in a second set of regions in the space comprising the original image data with a second density that is less than the first density.

6. The method of claim 5,
    wherein the subset of parent nodes comprises the decimated image data for the first set of regions, and
    wherein the subset of leaf nodes comprises the original image data in the second set of regions.

7. The method of claim 1 further comprising:
    determining the distribution of the plurality of original image data based on positional elements of the plurality of original image data, wherein the positional elements define positions for the plurality of original image data in the space.

8. The method of claim 1 further comprising:
    determining the distribution of the plurality of original image data based on non-positional elements of the plurality of original image data, wherein the non-positional elements define visual characteristics for the plurality of original image data in the space.

9. The method of claim 1, further comprising:
    determining the distribution of the plurality of original image data based on a return intensity with which each of the original image data from the plurality of original image data is measured by a scanner.

10. The method of claim 9, wherein generating the regularized image comprises:
filtering noise from the regularized image by removing the original image data associated with leaf nodes that do not intersect or are outside of the regularization curve.

11. The method of claim 1, wherein the regularization curve is a model of the distribution of the plurality of original image data in the plurality of leaf nodes.

12. The method of claim 1, wherein the regularization curve comprises:
one or more peaks corresponding to a first set of the plurality of original image data distributed in the space where the distribution has a maximum value, and
one or more troughs corresponding to a second set of the plurality of original image data distributed in the space where the distribution has a minimum value.

13. The method of claim 1, wherein generating the regularized image comprises:
excluding the original image data associated with leaf nodes under the subset of parent nodes from the regularized image.

14. The method of claim 1 further comprising:
receiving a request to generate the regularized image with a particular amount of uniformity; and
wherein applying the regularization curve comprises:
aligning the regularization curve at a first layer of the tree-based representation for a first amount of uniformity in a rendering of the regularized image; and
aligning the regularization curve at a different second layer of the tree-based representation for a second amount of uniformity in the rendering of the regularized image.

15. The method of claim 1, wherein applying the regularization curve comprises:
preserving a first amount of the plurality of original image data in the regularized image in response to applying the regularization curve at a first height in the tree-based representation; and
preserving a second amount of the plurality of original image data in the regularized image in response to applying the regularization curve at a different second height in the tree-based representation.

16. The method of claim 1, wherein the decimated image data associated with a particular parent node replaces the original image data associated with all leaf node under that particular parent node.

17. The method of claim 1, wherein generating the regularization curve comprises:
generating a curve or waveform that models the distribution across an arrangement of the plurality of leaf nodes in the tree-based representation.

18. The method of claim 1 further comprising:
presenting the regularized image on a display device.

19. An imaging system comprising:
one or more hardware processors configured to:
receive an image comprising a plurality of original image data that is non-uniformly distributed across a space represented by the image;
obtain a tree-based representation of the plurality of original image data, wherein the tree-based representation comprises a plurality of leaf nodes with each leaf node of the plurality of leaf nodes being associated with different original image data from the plurality of original image data, and a plurality of parent nodes with each parent node of the plurality of parent nodes being associated with decimated image data representing a different set of the plurality of original image data associated with a different set of the plurality of leaf nodes under that parent node with different amounts of decimation;
generate a regularization curve based on a distribution of the plurality of original image data;
apply the regularization curve to the tree-based representation; and
generate a regularized image from rendering the original image data associated with a subset of the plurality of leaf nodes and the decimated image data associated with a subset of the plurality of parent nodes that intersect or are within the regularization curve.

20. A non-transitory computer-readable medium storing program instructions that, when executed by one or more hardware processors of an imaging system, cause the imaging system to perform operations comprising:
receive an image comprising a plurality of original image data that is non-uniformly distributed across a space represented by the image;
obtain a tree-based representation of the plurality of original image data, wherein the tree-based representation comprises a plurality of leaf nodes with each leaf node of the plurality of leaf nodes being associated with different original image data from the plurality of original image data, and a plurality of parent nodes with each parent node of the plurality of parent nodes being associated with decimated image data representing a different set of the plurality of original image data associated with a different set of the plurality of leaf nodes under that parent node with different amounts of decimation;
generate a regularization curve based on a distribution of the plurality of original image data;
apply the regularization curve to the tree-based representation; and
generate a regularized image from rendering the original image data associated with a subset of the plurality of leaf nodes and the decimated image data associated with a subset of the plurality of parent nodes that intersect or are within the regularization curve.

* * * * *